UNITED STATES PATENT OFFICE.

LUDWIG BENDA, OF FRANKFORT-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

2.5-DIAMINOBENZENE-ARSINIC ACID.

1,040,260. Specification of Letters Patent. Patented Oct. 8, 1912.

No Drawing. Application filed February 3, 1912. Serial No. 675,152.

*To all whom it may concern:*

Be it known that I, LUDWIG BENDA, Ph. D., chemist, a citizen of the Republic of Switzerland, residing at Frankfort-on-the-Main, Germany, have invented certain new and useful Improvements in 2.5-Diaminobenzene-Arsinic Acid, of which the following is a specification.

I have found that by moderately reducing the 2-amino-5-nitrobenzene-arsinic acid, obtainable from para-nitranilin by heating it with arsenic acid, the 2-5-diaminobenzene-arsinic acid can be produced. This body is valuable both for therapeutic purposes and as a parent product for the manufacture of other organic arseno compounds.

Example: 13 kilos of 5-nitro-2-aminobenzene-1-arsinic acid are dissolved in 80 liters of 10 N. caustic soda-lye and 320 liters of water and mixed, while stirring, at ordinary temperature with 110 liters of ferro-oxid-salt solution (18.9 vol. % Fe). The reduction occurs with decoloration of the solution, which is at first yellowish-red. The test of the mixture by curcuma should show throughout an alkaline reaction. The ferruginous mud is filtered off and to this filtrate is added a quantity of sulfuric acid of 66° Bé., sufficient to give on Congo-paper a brownish reaction. After having allowed the mixture to stand for a good time, the 2.5-diaminobenzene-1-arsinic acid separated in the form of fine needles, is filtered off.

The new compound is difficultly soluble in cold water, pretty readily soluble in hot water; it readily dissolves in diluted mineral acids, as well as in alkalis and sodium acetate, also in hot acetic acid of 50% strength, but is difficultly soluble in ethyl alcohol; when heated to 210° C. it assumes a black color and decomposes.

Having now described my invention, what I claim, is:

As a new product, the 2.5-diaminobenzene-arsinic acid, being a white crystalline compound, difficultly soluble in cold water and ethyl-alcohol, readily soluble in hot water and diluted mineral acids, alkalis, and sodium acetate, decomposing when heated to 210° C.

In testimony whereof, I affix my signature in presence of two witnesses.

LUDWIG BENDA.

Witnesses:
 JEAN GRUND,
 CARL GRUND.